2,973,292
Patented Feb. 28, 1961.

2,973,292

ORGANIC PLASTIC DESTATICIZED WITH STRONTIUM-90, METHOD OF MAKING AND LAMINATE CONTAINING SAME

William H. Yanko, Samuel Steingiser, and Ival O. Salyer, Dayton, Ohio, assignors to Monsanto Chemical Company, St. Louis, Mo., a corporation of Delaware No Drawing. Filed May 27, 1953, Ser. No. 357,883

12 Claims. (Cl. 154—43)

This invention relates to plastics having anti-static properties, and to special methods of incorporating anti-static materials into plastics. In one aspect the invention pertains to use of certain radioactive isotopes in plastics. In another aspect the invention pertains to methods for effecting uniform distribution of radioactive isotopes into plastic materials.

The development of static charges on plastic materials has long been known. Such static charges accumulate on the surface of plastic objects and remain there until discharged. The static charges cause important difficulties. One of these is the collection of dust. Dust collection on some plastic articles, particularly those made from polystyrene, is often so severe that the resulting unsightly appearance makes the article unsuited for display or other aesthetic purposes. If the article is used as part of mechanical or electrical equipment, the difficulties caused by dust accumulation are self-evident. Accumulation of static charges on surfaces of plastics can in some instances cause electrical difficulties.

It has been shown that a severe formation of static electric charges on the surface of molded plastic articles occurs on separation of the article from the mold. Attempts to prevent this by coating the interior of the mold with destaticizing materials have been unsuccessful. Normal use of the object, as handling, rubbing, wiping, dusting, etc. results in building up of a static charge on plastic moldings. The idea has been advanced of making plastic materials dust-free by changing the sign of the electrical charge thereon in order to repel dust particles. This, however, is an erroneous theory, because ordinary household or outdoor dust and most industrial dusts are made up of particles having both positive and negative charges. Additionally, the static charges on the surface of a plastic are not ordinarily of a single sign but rather the plastic is covered with areas of positive charge and other areas of negative charge, the shape and interrelationship of these various areas depending greatly upon the method of preparation and treatment of the article.

It is known to subject plastic materials to the action of ionizing radiation resulting in formation of an ionized layer of air at the surface of the plastic which causes discharge of the static charges. This procedure has some industrial application where a plastic article can be subjected to such ionizing radiation and then immediately given a desired surface coating or other treatment, but permanent destaticization of course is not obtained. It has also been suggested to incorporate radioactive materials into polystyrene, viz. carbon-14, uranium oxide, and polonium. The first is unsuitable because it does not ionize well, comparatively large quantities would be necessary, and it is very expensive. Uranium oxide has a rather long half-life, but would have to be used in such large quantities as to give undesirable properties to the plastic. Polonium has rather good ionizing characteristics, but is not a beta-ray emitter, it has a half-life of only five months, and is extremely hazardous.

An object of this invention is to destaticize plastics. Another object is to provide a method for incorporating destaticizing materials into plastics. A further object is to provide organic plastic materials and articles that are resistant to the accumulation of static charges on the surface thereof. A further object is to effect the destaticization of polystyrene with materials that can be added in extremely small quantities. Yet a further object is to obtain plastic materials that are resistant to the accumulation of static charges thereon over long periods of time.

Other objects and advantages will be apparent to those skilled in the art from the accompanying discussion and disclosure.

In accordance with preferred aspects of the present invention, polystyrene or other organic plastic material is treated with small but effective quantities of one or more of the following radioactive elements, preferably in the form of compounds of said elements: strontium-90, yttrium-90, cerium-144, germanium-68. The named materials have certain important properties in common, but also differ from each other in specific aspects and are therefore not to be considered the full equivalents of each other. We have found that these materials are effective in extremely small quantities and therefore can be employed without adversely affecting the physical properties of the plastic material that is to be destaticized. Strontium-90, cerium-144 and germanium-68 all have sufficiently long half-lives to insure effective destaticization of plastics for periods greater than two years. Strontium-90 is particularly preferred because its half-life is 25 years. Yttrium-90 has a half-life of 65 hours and therefore can be used per se only in special applications in which the effective destaticization need be obtained for only a short period of time, in which case the short half-life is especially valuable. However, yttrium-90 is formed by decay of strontium-90 and therefore when provided in a plastic by adding strontium-90 to the plastic is effective over a period of time dependent not on the half-life of yttrium-90 but rather on the half-life of strontium-90. Strontium-90 decays by a 0.537 mev. (million electron volts) beta-ray to yttrium-90, which in turn emits a 2.35 mev. beta-ray forming stable zirconium-90. Cerium-144 has a half-life of 275 days and emits a 0.3 mev. beta-ray to form praseodymium-144, which has a half-life of 17.5 minutes and decays by a 3 mev. beta-ray to stable neodynium-144. Germanium-68 has a half-life of 250 days and decays by electron capture to gallium-68, which has a half-life of 68 minutes and decays by a 1.88 mev. positive beta-ray to stable zinc-68. The energies of the beta-rays given above are the maximum energies.

The radioactive isotopes with which this invention is concerned provide the desired destaticizing effect by virtue of the beta-radiation which they emit, which serves to ionize air at the surface of the plastic material, and also possibly causes ionization within the plastic material. The resulting ions discharge the static charges which have accumulated on the surface of the plastic, and continue to effect discharge of static charges that may accumulate on the surface of the plastic due to rubbing, handling, etc. subsequent to manufacture of the plastic material.

In practicing the present invention is any of its aspects, the radioactive materials in question present obvious health hazards which however can be easily controlled by those skilled in the art. Particular care of course should be employed in handling the radioactive materials prior to and during their incorporation into the plastic inasmuch as they will be used in concentrations that are extremely dangerous. The finished plastic product will in some instances not have sufficient radioactivity to be dangerous. In other instances, where a particularly rapid static discharge is desired, a concentration of the particular radioactive isotope in the plastic can be used to accomplish this which however may be dangerous if there is close exposure over a considerable period of time, and will therefore require special precautions in storing and handling of the plastic material. This however does not prevent its use in special applications, particularly military applications or others where the use can be controlled and alloted to trained personnel. Knowledge of methods of handling radioactive materials are now so well developed that the potential dangers mentioned in no way prevent practice of the invention but merely require precautions which will be obvious to those skilled in the art of handling radioactive materials. As a guide, it can be mentioned that quantities of strontium-90 greater than 1 millicurie are considered "high level" activities by the National Bureau of Standards, Handbook 42, "Safe Handling of Radioactive Isotopes."

This invention contemplates compositions of matter comprising plastic materials containing sufficient of one or more of strontium-90, yttrium-90, cerium-144 or germanium-68 to give a destaticizing effect, and also contemplates articles of manufacture made from these plastic materials and/or having a surface coating or layer of such plastic materials. The invention is applicable to any plastic natural or synthetic that accumulates and retains static charges to an undesired extent for a particular use. Polystyrene is the outstanding example of the more important commercial plastics, as it has an extremely high surface resistivity and is strongly subject to the disadvantages resulting from static charges. Thus, it has been calculated that a period of three years would be necessary for a static charge on polystyrene to leak off under ideal conditions, but since other natural factors operating during that time will tend to build the charge up, pure polystyrene cannot as a practical matter leak off its static charges. Methyl methacrylate is likewise subject to extreme retention of static charges on the surface. Other plastic materials which are particularly bad include polyethylene and ethyl cellulose. Some plastics exhibiting the phenomenon to a lesser degree include vinyl acetate-vinylidene chloride copolymer, cellulose acetate, cellulose acetate butyrate, cellulose propionate, phenol-formaldehyde resins, urea-formaldehyde, nylon and melamine resins. The invention is of general application to organic plastic materials, both thermoplastic and thermosetting; see Hackh's Chemical Dictionary, third edition, 1946 printing, pages 664-665, for a general definition and specific examples of suitable plastics.

In accordance with one aspect of the present invention, a method is provided for obtaining uniform dispersions of radioactive elements throughout a mass of plastic material. While such dispersion can be done with some degree of success by simple mechanical admixture and milling of the desired radioactive material, e.g., the oxide, sulfide, sulfate, chloride, acetate, or other compound of a radioactive element, into the plastic, this procedure is not desirable in that perfect uniformity of mixture is almost impossible to achieve and excessive working of the plastic is required to approach the necessary degree of uniformity. It will be apparent that complete homogeneity and uniformity of dispersion are of great importance for purposes of the present invention, particularly in those instances wherein use of the plastic material requires the absence of any substantial static charge on all areas of the plastic surface.

One preferred embodiment of the invention involves the incorporation of a water-soluble salt of the desired radioactive element into an aqueous emulsion of the desired plastic. A preformed emulsion, made either by emulsion polymerization of the monomer or monomers, or by deliberate formation of an emulsion from a previously made polymer or other plastic, can have incorporated therein a water-soluble salt of strontium-90, for example. Preferably an aqueous solution of the strontium-90 salt, for example strontium-90 dinitrate, is prepared and added with vigorous agitation into the aqueous emulsion of the plastic. These operations will necessarily involve the initial handling of the strontium-90 salt or other radioactive salts in quantities such that suitable safety precautions should be observed as noted above.

A presently available form of strontium-90 is a water solution of strontium-90 chloride in 3 N-hydrochloric acid, containing 1 millicurie strontium-90 per ml. of solution, the strontium-90 chloride being present in such quantities that the total solids content of the solution is less than 5 mg. per ml. Strontium-90 is also available as the nitrate. Strontium-90 is a fission product available from the operation of atomic piles.

Preferably a relatively dilute solution of the strontium-90 is introduced into the emulsion, with vigorous agitation as stated. It has been found that the particles of the plastic material present in the emulsion preferentially adsorb the radioactive salt from the aqueous phase. Preferably a period of one hour or longer is provided after incorporation of the radioactive salt into the emulsion to allow this preferential adsorption to take place. The emulsion can then be broken by addition of electrolytes, by freezing, or by any other suitable procedure, many of which are well-known to the art. The coagulated plastic material, containing the radioactive isotope, is then separated from the aqueous phase, dried, and employed in whatever manner is desired for manufacture of finished plastic sheeting, tubing, injection or compression molded articles, etc. Instead of breaking the emulsion, it is permissible to subject the total emulsion to drying, as by spray drying or otherwise, and this has the advantage of insuring complete retention of all of the added radioactive salt in the plastic material. By carrying out the invention by the methods described, complete uniformity of distribution of radioactive material within the entire body of plastic mass is insured. (In the accompanying claims, in the term "polymer containing said radioactive metal homogeneously dispersed therein" or words of like import, the word "metal" refers to the radioactive metal in whatever form it may exist, whether it be as a metal per se, i.e., in its elemental state, or as one or more compounds of the metal.) Where the particular plastic, for example, polystyrene, polymethyl methacrylate, etc., is normally made by emulsion polymerization, it is permissible to add the strontium-90 nitrate or other radioactive salt to the emulsion at the start of the polymerization, or it can be added during the polymerization or after the polymerization has been completed. Polystyrene, polyethylene, or other polymers of monomeric materials made by mass polymerization or other procedures not involving an emulsion can be put into the form of aqueous emulsions in known manner, and the water-soluble radioactive salt then added to the emulsion.

Although procedures for effecting emulsion polymerization of styrene and numerous other monomers are well known in the art, the following information can be given on the preparation of polystyrene by emulsion polymerization by way of example. Methods for preparing emulsion polystyrene are many and varied and the following will serve to illustrate only one of the many suitable means for manufacturing this product. The equipment is essentially a reaction vessel or kettle equipped with an agitating device (stirrer) and having means provided for adding and removing heat by means of a jacket and condensers. The raw materials required are: water, emulsifying agent, catalyst, modifier (regulator) and styrene monomer. A suitable emulsifier would be of the anionic type such as sold under the trade name of "Santomerse," "Acto-450," etc. These are the sodium salts of sulfonated aryl-alkyl hydrocarbons wherein the alkyl side chain has usually 8 or more carbon atoms. The concentration of emulsifier is in the range of 0.5 to 5.0 weight percent, based on weight of monomer. A suitable catalyst is potassium persulfate, and concentrations in the order of 0.05 to 0.5 weight percent can be used. If desired, to control the molecular weight of the product a mercaptan-type modifier, for example, dodecyl mercaptan, is used at concentrations in the range of 0.01 to 1.0 percent. Usually the water, emulsifier, catalyst and modifier are charged to the reaction vessel and the whole brought up to reflux (100° C.). The monomer is then added slowly with continuous agitation, until the solids content of the batch is in the 25 to 50 percent range. The reaction vessel is then heated a short time at reflux, then steam-distilled to remove any traceable quantities of unreacted monomer. The polymer latex or emulsion is then drained from the reactor and used as desired. Depending upon the amount of emulsifier, agitation, catalyst and other reaction conditions, the particle size of the latex particles will vary considerably. However, under the usual conditions of preparation, particle sizes of 0.1 to 1.0 micron are produced. As stated above, strontium-90 nitrate, or chloride or other radioactive salt can be added to the emulsion after the polymerization has been completed, or at the beginning or during the polymerization.

By another procedure within the scope of the present invention, an oil-soluble salt of the desired radioactive isotope, for example, the naphthenate, oleate, etc., is added to a monomeric material which is then subjected to polymerization to form the desired plastic by any of the known polymerization procedures, such as mass polymerization, polymerization in a solvent, polymerization in solvent-non-solvent systems, suspension polymerization or emulsion polymerization. By way of example, polystyrene containing the chosen quantity of strontium-90 stearate is subjected to mass polymerization in known manner in a polymerization cycle of 30 hours at 120° C. This procedure insures completely uniform dispersion of the radioactive isotope throughout the mass of the polystyrene.

The quantity of radioactive isotope to be employed, of course, will be greatly dependent upon the particular plastic material involved, and the extent of the destaticization that is necessary for a given use. Those skilled in the art, having been given the benefit of the present disclosure, will be able to determine in any given situation a suitable quantity of a particular radioactive isotope of the group named to be used. By way of example, wtih polystyrene admixed with strontium-90 dinitrate, a level of 0.1 microcurie per gram of polymer is necessary before any appreciable destaticization occurs. Levels of from 1 to 10 microcuries of strontium-90 per gram are adequate for reducing the half life of an induced charge from infinity to less than one minute. Where necessary, levels greater than 10 microcuries per gram of polymer can be used to effect even more rapid destaticization. In many instances a relatively slow rate of destaticization will be sufficient for the desired use, and in such instances the level of radioactivity can be kept low.

Questions of convenience and cost will determine whether an article manufactured from polystyrene or other plastic will use only the plastic containing the radioactive material, or will be made partly or largely of a non-destaticized plastic and provided with only a surface coating of plastic containing the destaticizers of the present invention. Many objects are normally made by lamination of a plurailty of sheets of plastic materials and therefore are suited to the employment of only a thin surface sheet of plastic containing the radioactive destaticizer. By way of example can be mentioned radome covers for jet planes. The static charges that accumulate on plane surfaces can be dissipated evenly into the atmosphere by attachment of a conducting discharge wick to metallic parts, e.g., trailing edges of wings. However, this method is not available to discharge static charges that accumulate on large areas of glass or plastic surfaces on the exterior of a plane. Such charges can give trouble to radio, radar and other equipment of the plane. In accordance with this invention, a radome cover or other plastic surface for a portion of the exterior of an airplane can be made of laminated, transparent materials, the final outer coat being a thin layer of polystyrene or other plastic containing a destaticizing radioactive element as described herein. The concentration of such element can be as high as necessary to provide the desired rate of static discharge, as in this special application only highly trained personnel are near the object and the necessary safety precautions and protection can be provided.

The following examples provide information on certain specific aspects of preferred embodiments of the invention. It will be understood, of course, the variations in the materials and amounts thereof can be made without departing from the invention.

*Example 1*

A polystyrene latex was employed, which had been prepared by the emulsion polymerization of styrene monomer. The latex in the amount of 30 grams was treated with 0.5 microcurie strontium-90 dinitrate containing 1 mg. inactive Sr—$(NO_3)_2$ added in the form of a water solution. The resulting mixture was stirred for one hour. The material was then frozen to break the emulsion and upon thawing the water was then removed by filtration.

Radiometric assay of the separated water solution showed that 55 weight percent of the strontium-90 had been adsorbed on the polymer. This selective adsorption resulted in the completely homogeneous and uniform incorporation of the strontium-90 within the mass of polymer.

*Example 2*

Portions of the polystyrene latex described in Example 1 were treated in the manner described in Example 1, with sufficient strontium-90 dinitrate to give, respectively, 0.01, 0.1, 1.0 and 5.0 microcuries strontium-90 per gram of polymer. Each emulsion sample was then stirred and heated at 60° C. until the water had evaporated. The resulting materials were further dried for 2 hours at 90° C.

Samples weighing 9 grams each, of each of the foregoing four polymers, were compression molded into two-inch discs. The molded discs were monitored showing the following ionizing radiation intensities as a function of distance from the surface.

| Microcuries Sr-90 Per Gram of Polymer | Radiation Intensity, milliroentgens (mr.) per hour distance away from plastic surface | | | |
| --- | --- | --- | --- | --- |
| | 0 in. | 3 in. | 6 in. | 12 in. |
| 0.01 | [1] 0.2 | 0 | 0 | 0 |
| 0.1 | 4.2 | 0.8 | 0.2 | 0 |
| 1.0 | 42 | 7.5 | 2.5 | 0.4 |
| 5.0 | 240 | 40 | 14 | 1.5 |

[1] Intensities are in milliroentgens (mr.) per hour.

It is to be noted that a radiation level of 2.5 mr. per hour is considered as the AEC permissible level for a 24 hour exposure. Thus at reasonable distances, these should present no particular difficulties in use.

The samples were tested for static charge loss using an electrostatic modulator. This is a device for detecting and measuring the magnitude and the sign of a static charge. By means of a moving plate, the charge is converted into an A.C. signal which is amplified and phased in with a known signal to produce a record of the magnitude of the original charge and whether it is positive or negative. The chart produces a function of charge versus time, from which one can calculate the half-life of charge decay to the atmosphere. The method of calculation is known to those versed in the art. The results are tabulated in the table below, where comparisons are made between the four concentrations of strontium-90 nitrate in polystyrene and a control polystyrene containing no strontium-90.

DESTATICIZATION OF POLYSTYRENE WITH Sr-90

| Sample (Conc.) | Rubbed With— | | | | Calc. A $t_{1/2}$ |
|---|---|---|---|---|---|
| | Paper | | Wool | | |
| | Total Charge (Volts) | R $t_{1/2}$ (Min.) | Total Charge (Volts) | R $t_{1/2}$ (Min.) | |
| 5.0 μc./g | −3,500 | 1.7 | −3,000 | 2.0 | 2 min. |
| | −4,500 | 2.5 | −3,750 | 2.2 | |
| 1.0 μc./g | −5,000 | 14 | −6,500 | 14 | 16–17 min. |
| | −4,620 | 13 | | | |
| | −4,100 | *11 | | | |
| | −4,000 | *13 | | | |
| 0.1 μc./g | −3,750 | 43 | −4,100 | 46 | 90–93 min. |
| 0.01 μc./g | −3,250 | 88 | −4,000 | 86 | Infinite. |
| Control | −2,750 | 88 | −3,500 | 80 | Infinite. |

NOTES:
*Washed with methanol.
Time for charge to go to zero=56 min., no charge build-up for discharged state.
Relative humidity=30%.
Room temperature=72° F.
μc.=microcurie.
$t_{1/2}^R$=half-life of charge dissipation as measured.
$t_{1/2}^A$=half-life as calculated by using the control as base value $$\frac{t_{1/2}^A}{(t_{1/2}^B)} = \frac{t_{1/2}^R}{t_{1/2}^B} \cdot \frac{t_{1/2}^B}{t_{1/2}^R}$$

The time for the charge to dissipate to half of its original value is listed as the half-life in the table. It will be noted that the lowest concentration (0.01 microcurie strontium-90 gram of polystyrene) gave no more charge loss than the control and therefore this concentration was ineffective in carrying out the purposes of this invention. The other concentrations tested gave definite destaticization.

*Example 3*

The tests described above in Example 2 were carried out on molded discs of polystyrene containing 2.4 microcuries of carbon-14 per gram. The presence of the carbon-14 therein gave no measurable destaticization.

While the invention has been described with particular reference to various preferred embodiments thereof, it will be appreciated that variations from the details given herein can be effected without departing from the invention in its broadest aspects.

We claim:

1. An organic plastic material that would normally be subject to accumulation of static electrical charge on the surface, containing strontium-90 in a destaticizing quantity of more than about 0.01 and not more than about 10 microcuries per gram of plastic material.

2. An organic plastic material that would normally be subject to accumulation of static electrical charge on the surface, containing strontium-90 in a destaticizing quantity of from about 0.1 to about 10 microcuries per gram of plastic material.

3. Polystyrene containing strontium-90 in a destaticizing quantity of from about 0.1 to about 10 microcuries per gram of polystyrene.

4. A process which comprises forming a stable aqueous emulsion of an organic plastic material that would normally be subject to accumulation of static electrical charge on the surface, dispersing in said emulsion a water soluble salt of strontium-90 in extremely small quantities sufficient to result in a self-destaticizing plastic, and recovering from said emulsion organic plastic material containing said strontium-90 homogeneously dispersed therein.

5. A process which comprises forming a stable aqueous emulsion of a polymer of a polymerizable monomeric organic compound containing ethylenic unsaturation, said polymer being one that would normally be subject to accumulation of static electrical charge on the surface, dispersing in said emulsion a water-soluble salt of strontium-90 in extremely small quantities sufficient to result in a self-destaticizing polymer, and recovering from said emulsion polymer containing said strontium-90 homogeneously dispersed therein.

6. A process which comprises forming a stable aqueous emulsion of a polystyrene, dispersing in said emulsion a water-soluble salt of strontium-90 in extremely small quantities sufficient to result in a self-destaticizing polystyrene, and recovering from said emulsion polystyrene containing said strontium-90 homogeneously dispersed therein.

7. A process which comprises subjecting to polymerization in aqueous emulsion a polymerizable monomeric organic compound containing ethylenic unsaturation that forms a polymer that would normally be subject to accumulation of static electrical charge on the surface, in the presence of a water-soluble salt of strontium-90 in extremely small quantities sufficient to result in a self-destaticizing polymer.

8. A process which comprises dissolving in a polymerizable monomeric organic material containing ethylenic unsaturation, that forms a polymer that would normally be subject to accumulation of static electrical charge on the surface, an oil-soluble salt of strontium-90 in extremely small quantities sufficient to result in a self-destaticizing polymer, and subjecting same to polymerization to obtain said polymer containing said strontium-90 homogeneously dispersed therein.

9. An article of manufacture comprising at least a surface of an organic plastic material that would normally be subject to accumulation of static electrical charge on the surface, said plastic material containing strontium-90 in a destaticizing quantity of more than about 0.01 and not more than about 10 microcuries per gram of plastic material.

10. A laminate made up of a plurality of thin layers of solid materials bonded together, at least the outer layer of which is composed of an organic plastic material that would normally be subject to accumulation of static electrical charge on the surface and containing strontium-90 in a destaticizing quantity of more than about 0.01 and not more than about 10 microcuries per gram of plastic material.

11. Polystyrene containing an extremely small but destaticizing quantity of strontium-90.

12. An organic plastic material that would normally be subject to accumulation of static electrical charge on the surface, containing an extremely small but destaticizing quantity of strontium-90.

References Cited in the file of this patent
UNITED STATES PATENTS
2,559,259    Raper _____ July 3, 1951